UNITED STATES PATENT OFFICE.

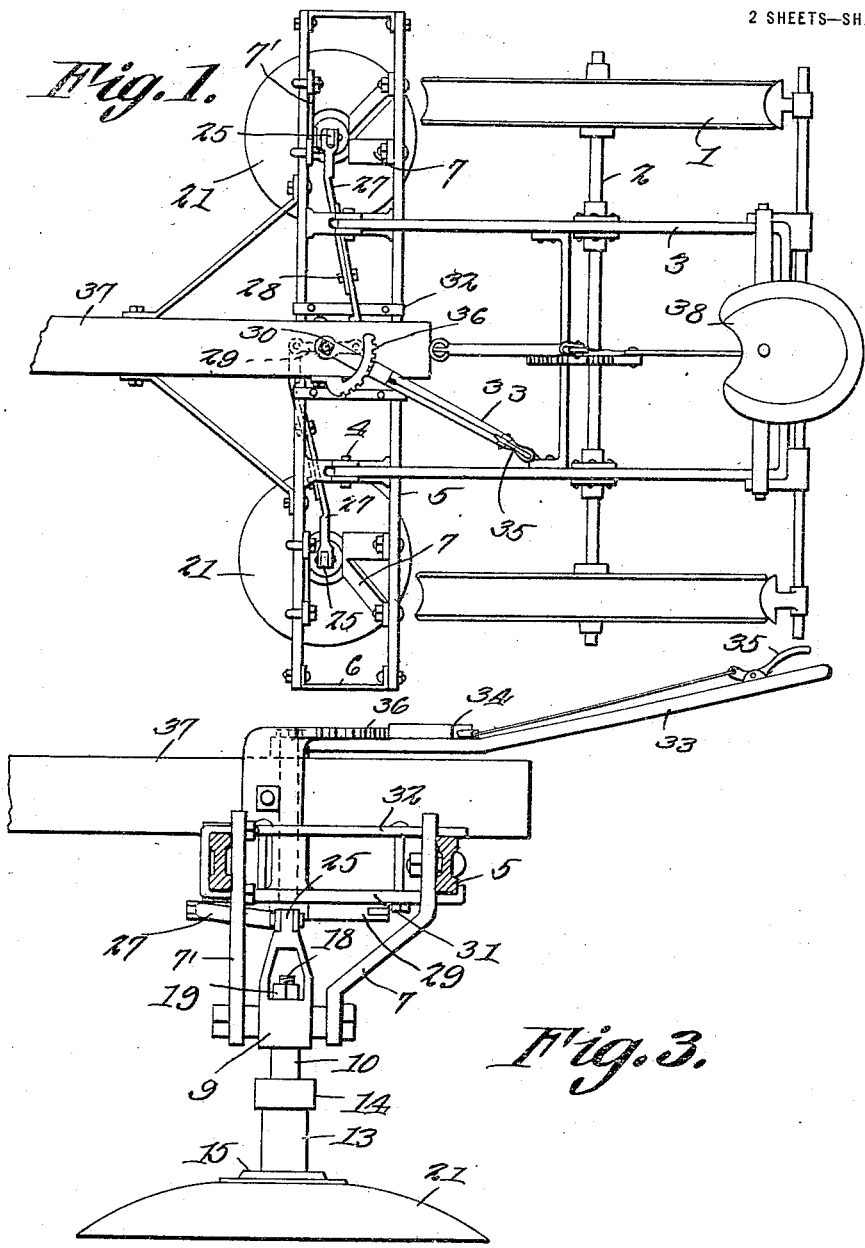

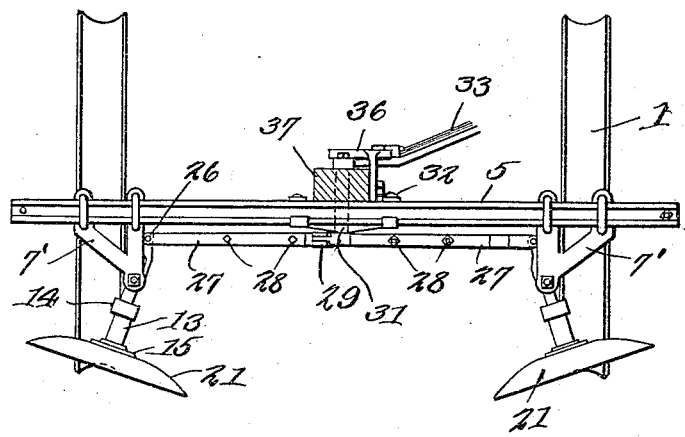
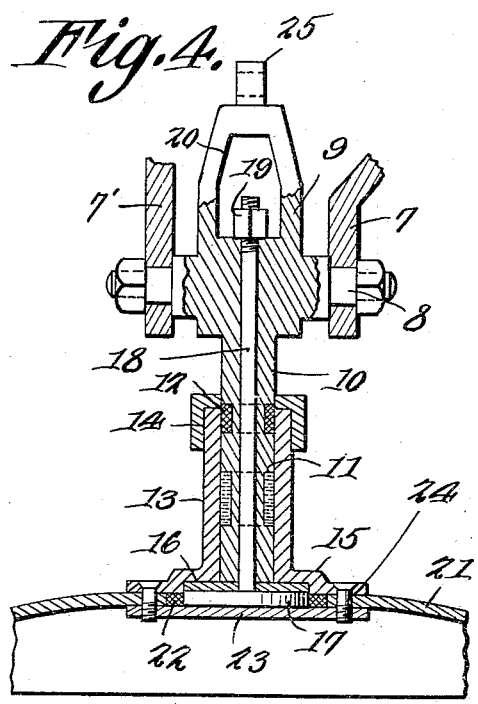
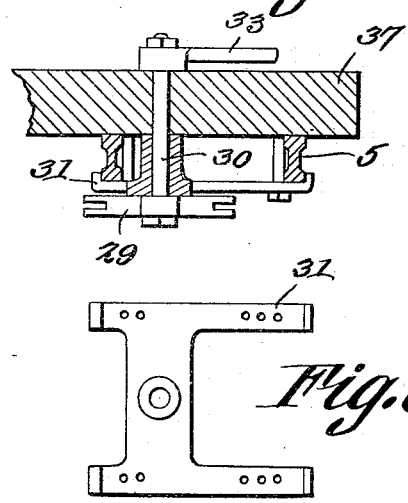

WELLMAN K. HUFF, OF GUY, NEW MEXICO.

ATTACHMENT FOR PLANTERS.

1,298,046.    Specification of Letters Patent.    Patented Mar. 25, 1919.

Application filed February 25, 1918.    Serial No. 219,058.

*To all whom it may concern:*

Be it known that I, WELLMAN K. HUFF, a citizen of the United States, residing at Guy, in the county of Union and State of New Mexico, have invented a new and useful Attachment for Planters, of which the following is a specification.

This invention appertains to an attachment for planters, and especially for planters of the check row variety, and contemplates an attachment for the planter frame which will convert the machine into a cultivator.

The invention also contemplates the production of a cultivator of the horizontally disposed, rotary disk type, and means for adjusting the disks at various angles.

A further object of the invention is the provision of a dust proof bearing for the disk.

A still further object within the contemplation of the invention is the production of a simple, durable, and efficient attachment for planters.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawings, wherein:—

Figure 1 is a plan view of a cultivator with the attachment constructed in accordance with the invention in place thereon;

Fig. 2 is a front elevation of the same, the planter tongue shown in section;

Fig. 3 is a view in side elevation partly in section, and parts removed;

Fig. 4 is an enlarged fragmentary detail in central vertical section, portions in elevation, of the disk and its spindle;

Fig. 5 is an enlarged fragmentary detail, partly in elevation and partly in section, of the disk operating lever;

Fig. 6 is a plan view of the supporting and journaling plate for the lever.

Referring to the drawings by numerals of reference:—

In carrying out the invention there is provided any usual and ordinary form of planter, consisting of the wheels 1 which turn on the shaft 2 on which shaft is supported the usual frame 3. Hangers 4 depend from the forward end of the frame 3 and support the spaced transverse bars 5—5. The bars 5—5 form a support for the seed hoppers and shoes, not shown.

When the planter is to be converted into a cultivator, the seed hoppers and shoes, and the mechanism for operating the seed delivery slides is removed. In order to strengthen the transverse frame, cross bars 6 may be secured between the bars 5 at each end thereof.

Depending brackets 7 are secured by bolts or otherwise to the rear bar 5 and toward each end thereof, and these brackets are preferably angled to extend forwardly as shown. Brackets 7' are secured to and depend from the front bar 5 in alinement forwardly of the brackets 7. The brackets 7' depend vertically from the bar 5 to which they are clamped by U-bolts or otherwise.

The lower ends of the brackets 7 and 7' are apertured to form bearings for the trunnions 8 which extend radially from diametrically opposed portions of the head 9 of a spindle 10. As the cultivator attachment at each end of the transverse frame is of the same construction, only one will be described herein.

The spindle 10 is provided, toward its lower end, with an annular groove 11 which forms a receptable for the reception of hard oil or like lubricant. Spaced from the groove 11 toward the head of the spindle 10 is an annular groove for the reception of packing 12, which packing may also serve to absorb oil or other lubricant. The main purpose of this packing is to form a dust proof joint. The lower end of the spindle 10 is surrounded by a sleeve 13 the upper end of which is closed by a cap 14 which surrounds the spindle 10 and is seatable downwardly upon the sleeve 13. This cap, together with the packing 12 completely excludes dust from the sleeve 13.

At the lower end of the sleeve 13 is formed the integral, outwardly extending, annular flange 15 which flange is counter-sunk to receive a washer 16. The washer 16 is confined between the face of the flange and the disk-like head 17 of a bolt 18 which bolt extends through the central longitudinal bore of the spindle 10 and has its upper end threaded to receive a nut 19 which serves to clamp the bolt tightly in place. The head 9 of the spindle 10 is apertured, as at 20, to permit the nut 19 to be easily threaded on the end of the bolt 18.

Seated on the lower face of the flange 15 and encircling the head 17 is a washer 22 which fills the annular space between the periphery of the head 17 and the rim defining a central circular opening formed in a dished disk 21. A circular plate 23 is secured to the lower face of the disk 21 to house the head 17 and the washer 22, and this plate is provided with threaded apertures which aline with apertures formed in the disk 21 and in the flange 15 for the purpose of receiving counter-sunk screws 24 which serve to bind the disk 21 and plate 23 firmly in place. From this it will be seen that a thoroughly dust proof joint is also formed at the lower end of the spindle 10.

An apertured lug 25 is formed on and rises from the head 9 of the spindle, and is pivotally secured by a pin 26 to one end of an adjustable connecting rod or link 27. The rod or link 27 is adjustable longitudinally and may be secured in its adjusted positions by means of bolts 28 or otherwise.

The other end of the rod or link 27 is pivotally connected to the bifurcated end of an arm 29 which extends diametrically of a shaft 30, to one end of which it is rigidly affixed. The shaft 30 is vertically disposed and is journaled in a suitable boxing formed in the cross bar of an H-shaped supporting plate 31. The H plate 31 is secured beneath the transverse frame composed of the bars 5 and is held in place by bolts which pass through apertures formed in the arms of the plate and also through bars 32 which overlie the bars 5, or in any other suitable manner.

The H plate 31 underlies the tongue 27 of the planter, and the tongue is apertured to receive the upwardly extending end of the shaft 30 the upper end of which shaft extends above the tongue. A hand lever 33 is secured to the upwardly extending end of the shaft 30 and the lever is in position to be easily grasped by the operator when occupying the seat 38 of the machine. The hand lever 33 is provided with the usual spring pressed dog 34 which is operated by the lever 35, and which normally engages the teeth of a segmental rack 36 to retain the lever 33 and connected parts in set position.

From the foregoing it will be apparent that the lever 33 may be operated to rotate the shaft 30 and arm 29 so that, through the links 27, the spindles 10 may be rocked on their trunnions to adjust the disks 21 to various cutting angles.

Having thus described the invention, what is claimed as new and sought by Letters Patent, is:—

1. An attachment for planters, including a spindle having a central longitudinal bore, a sleeve rotatable on the spindle, a cutting disk secured to the sleeve, a bolt insertible through the bore for clamping the sleeve and disk in place upon the spindle, and means on the spindle for attaching the same to a support.

2. An attachment for planters, including a spindle having a central longitudinal bore, a sleeve rotatable on the spindle, a cutting disk secured to the sleeve, a bolt insertible through the bore for clamping the sleeve and disk in place upon the spindle, and means for closing the ends of the sleeve.

3. An attachment for planters, including a spindle, a head formed on the spindle and having an aperture, the said spindle having a longitudinal bore communicating with the aperture, a sleeve rotatable on the spindle, a cutting disk attached to the sleeve, and means insertible through the longitudinal bore for securing the sleeve and disk in place upon the spindle.

4. An attachment for planters, including a spindle, a head formed on the spindle and having an aperture, the spindle having a longitudinal bore communication with the aperture, trunnions extending from the head of the spindle, a sleeve rotatable on the spindle, a cutting disk attached to the sleeve, and a bolt extending through the longitudinal bore and into the aperture for securing the sleeve and disk to the spindle.

In testimony that I claim the foregoing as my own, I have hereto affixed my signature in the presence of two witnesses.

WELLMAN K. HUFF.

Witnesses:
JAMES W. HUFF,
LARKIN L. DANIELS.